UNITED STATES PATENT OFFICE.

LOUIS MATHIEU AND JULES MORFAUX, OF CONSTANTINE, ALGERIA, FRANCE.

PROCESS OF DETECTING COLORING-MATTER DERIVED FROM COAL-TAR IN WINE.

SPECIFICATION forming part of Letters Patent No. 416,794, dated December 10, 1889.

Application filed April 24, 1889. Serial No. 308,459. (No specimens.)

*To all whom it may concern:*

Be it known that we, LOUIS MATHIEU and JULES MORFAUX, of Constantine, Province of Algeria, Republic of France, have invented certain new and useful Improvements in the Process of Detecting Coloring-Matter Derived from Coal-Tar in Wine; and we do hereby declare the following to be a full, clear, and exact description of the invention, such as will enable others skilled in the art to which it appertains to make and use the same.

The invention consists in and has for its object to provide a process of detecting coloring-matter derived from coal-tar or from cudbear or cochineal dye in wine, substantially as hereinafter fully described, and as set forth in the claims.

It is well known that wines are frequently colored with coloring-matter derived from coal-tar or with cochineal dyes or dyes derived from cudbear, all of which are injurious to health. By our process such dyes or coloring-matter in wine is readily and speedily detected, and is based upon the action of a reagent upon the natural color of wine.

In carrying out our invention we take white scoured and uncharged silk, or silk free from all coloring-matter or sizing, and immerse it for about twelve hours in a solution of nitric acid containing about one part acid of about 30° Baumé and nine parts water, after which the excess of acid is removed by washing in water. The silk threads are gathered into a bunch or tuft and tied at one end, the simplest mode being the use of a rubber band, and such band may be provided with a loop or a hook for suspending the tuft in the test and dye glasses. The nitrated silk may then be dried and kept for future use, or it may be used immediately by suspending it in the wine to be tested and whereby the silk is dyed. The dyed tuft of silk is then removed from the wine, the excess of the latter squeezed out with the fingers or otherwise, and immediately suspended in the reagent. The reagent is composed of one thousand grams distilled water, four hundred and fifty grams of crystallized neutral acetate of lead, and twenty cubic centimeters of crystallizable acetic acid. The solution is attenuated with ten times its volume of water when it is about to be used. The tuft of silk is suspended in the attenuated reagent and any change in color observed. In the absence of any of the dye-stuffs or coloring-matter referred to a discoloration from red to grayish-green or blue, according to the vines from which the grapes were gathered, takes place almost immediately after immersion into the reagent. This is not the case, however, when coloring-matter of the nature of that referred to had been employed in giving color to the wine, there being no change in color, and any persistency in the maintenance of the red color will denote the presence of such coloring-matter as has been herein referred to.

Any suitable means may be employed in making the tests. As a convenient means and for the purpose of placing such means at the disposition of those interested or requiring the use thereof, we propose to provide a case in which are conveniently arranged a metallic tube containing a number of nitrated tufts of silk, or, for the reception of such tufts, a glass tube provided with a screw-cap, on the inside of which is secured a small hook from which the tuft of silk may be suspended for dyeing it in the wine to be tested, a glass test-tube similarly provided with a screw-cap having a hook for suspending the dyed tuft and subjecting the same to the action of the reagent and a support for the tubes. To these we propose to add an assortment of coloring-matter—such as red dyes derived from coal-tar, cochineal dyes, and dyes obtained from cudbear for experimental purposes.

Having described our invention, what we claim is—

1. The herein-described process of detecting the presence in wine of coloring-matter of the nature of that referred to, which consists in dyeing a tuft of silk in the wine to be tested and then subjecting the dyed silk to the action of a reagent consisting of a solution of neutral acetate of lead acidulated with nitric acid.

2. The herein-described process of detecting the presence in wine of coloring-matter of the nature of that referred to, which consists in dyeing a tuft of silk in wine without alkalizing the latter or mordanting the silk and then subjecting the dyed silk to the action of a reagent consisting of a solution of neutral acetate of lead acidulated with nitric acid.

3. The herein-described process of detecting the presence in wine of coloring-matter of the nature of that referred to, which consists in nitrating white scoured and uncharged silk by immersion in a solution of nitric acid, dyeing the silk by immersion in the wine, and subjecting the dyed silk to the action of a reagent consisting of neutral acetate of lead acidulated with nitric acid.

In testimony that we claim the foregoing we have hereunto set our hand, this 11th day of March, 1889.

L. MATHIEU.
J. MORFAUX.

Witnesses:
FREDERIC MATRAY,
LÉON SCHMITTBUHL.